United States Patent
Col et al.

(10) Patent No.: US 6,189,091 B1
(45) Date of Patent: Feb. 13, 2001

(54) APPARATUS AND METHOD FOR SPECULATIVELY UPDATING GLOBAL HISTORY AND RESTORING SAME ON BRANCH MISPREDICTION DETECTION

(75) Inventors: Gerard M. Col; G. Glenn Henry; Dinesh K. Jain, all of Austin, TX (US)

(73) Assignee: IP First, L.L.C., Fremont, CA (US)

(*) Notice: Under 35 U.S.C. 154(b), the term of this patent shall be extended for 0 days.

(21) Appl. No.: 09/203,844

(22) Filed: Dec. 2, 1998

(51) Int. Cl.$^7$ .................................................. G06F 15/00
(52) U.S. Cl. ............................................. 712/240; 712/228
(58) Field of Search ................................... 712/239–240, 712/228

(56) References Cited

U.S. PATENT DOCUMENTS

| | | | |
|---|---|---|---|
| 5,584,001 | * 12/1996 | Hoyt et al. | 712/238 |
| 5,758,142 | * 5/1998 | McFarling et al. | 712/239 |
| 5,864,697 | * 1/1999 | Shiell | 712/240 |
| 5,872,950 | * 2/1999 | Levitan et al. | 395/393 |
| 5,978,909 | * 11/1999 | Lempel | 712/240 |
| 6,088,793 | * 7/2000 | Liu et al. | 712/239 |
| 6,092,187 | * 7/2000 | Killian | 712/239 |

OTHER PUBLICATIONS

Jacobsen et al., "Assigning confidence to conditional predictions", 1996. pp. 142–152.*
Using Hybrid Predictors to Improve Branch Prediction Accuracy in the Presence of Context Switches, Evers et al, ISCA May 1996.
Superscalar Microprocessor Design, Mike Johnson, Prentice Hall 1991.
A System Level Perspective on Branch Architecture Performance, Calder et al 1995 IEEE.
Alternative Implementations of Hybrid Branch Predictors, Chang et al, 1995 IEEE.
The Bi–Mode Branch Predictor, Lee et al, 1997 IEEE.
Assigning Confidence to Conditional Predictions, Jacobsen et al, 1996 IEEE.
Gshare, 'Agrees' Aid Branch Prediction, Linley Gwennap, Nov. 17, 1997, Microprocessor Report.
Combining Branch Predictors, Scott McFarling, Jun. 1993, WRL–Technical Note TN–36.
The Agree Predictor; A Mechanism for Reducing Negative Branch History Interference, Eric Sprangle et al.

* cited by examiner

Primary Examiner—Eddie Chan
Assistant Examiner—Stacy Whitmore
(74) Attorney, Agent, or Firm—E. Alan Davis; James W. Huffman (57) ABSTRACT

An apparatus and method for improving microprocessor performance by improving the prediction accuracy of conditional branch instructions is provided. A dynamic branch predictor speculatively updates global branch history information based on the prediction of a first branch instruction so that the predictor can predict the outcome of a second branch instruction following closely in the pipeline with the benefit of the first prediction. This improves the prediction accuracy where the first branch has not been resolved prior to the time when the second prediction is ready to be made. If the first prediction turns out to be incorrect, the global branch history is restored from a previously saved copy and updated with the first branch instruction's actual outcome.

22 Claims, 8 Drawing Sheets

| Cycle | F | X | R | A | D | W | GHB |
|---|---|---|---|---|---|---|---|
| 1 | JZ | | | | | | 1010 |
| 2 | ADD | JZ  901 | | | | | 1010 |
| 3 | DEC | ADD | JZ | | | | 1010 |
| 4 | JNS | DEC | ADD | JZ | | | 1010 |
| 5 | | JNS 904 | DEC | ADD | JZ  902 | | 1010 |
| 6 | | | JNS | DEC | ADD | JZ | 1101  903 |
| 7 | | | | JNS | DEC | ADD | 1101 |
| 8 | | | | | JNS | DEC | 1101 |
| 9 | | | | | | JNS | 0110 |

Fig. 10 (Related Art)

| Cycle | F | X | R | A | D | W | GHB |
|---|---|---|---|---|---|---|---|
| 1 | JZ | | | | | | 1010 |
| 2 | ADD | JZ 1001 | | | | | 1010 |
| 3 | DEC | ADD | JZ | | | | 1010 |
| 4 | JNS | DEC | ADD | JZ | | | 1010 |
| 5 | | *** 1004 | DEC | ADD | JZ 1002 | | 1010 |
| 6 | | *** | *** | DEC | ADD | JZ | 1101 1003 |
| 7 | | JNS 1005 | *** | *** | DEC | ADD | 1101 |
| 8 | | | JNS | *** | *** | DEC | 1101 |
| 9 | | | | JNS | *** | *** | 1101 |
| 10 | | | | | JNS | *** | 1101 |
| 11 | | | | | | JNS | 0110 |

Fig. 11

| Cycle | F | X | R | A | D | W | GHB/Temp224/Temp220 |
|---|---|---|---|---|---|---|---|
| 1 | JZ | | | | | | 1010/xxxx/xxxx |
| 2 | ADD | JZ 1101 | | | | | 1101/1010/xxxx  1103 |
| 3 | DEC | ADD | JZ | | | | 1101/1010/xxxx |
| 4 | JNS | DEC | ADD | JZ | | | 1101/1010/xxxx |
| 5 | | JNS 1106 | DEC | ADD | JZ 1102 | | 0110/1101/1101  1104 |
| 6 | | | JNS | DEC | ADD | JZ | 0110/1101/1101 |
| 7 | | | | JNS | DEC | ADD | 0110/1101/1101 |
| 8 | | | | | JNS | DEC | 0110/1101/1101 |
| 9 | | | | | | JNS | 0110/1101/1101 |

Fig. 12

| Cycle | F | X | R | A | D | W | GHB/Temp224/Temp220 |
|---|---|---|---|---|---|---|---|
| 1 | JZ | | | | | | 1010/xxxx/xxxx |
| 2 | ADD | JZ 1201 | | | | | 0101/1010/xxxx  1203 |
| 3 | DEC | ADD | JZ | | | | 0101/1010/xxxx |
| 4 | JNS | DEC | ADD | JZ | | | 0101/1010/xxxx |
| 5 | | JNS 1206 | DEC | ADD | JZ 1202 | | 0101/1010/1010 |
| 6 | | | JNS | DEC | ADD | JZ | 1010/1010/1010  1207 |
| 7 | | | | | | | 1101/1010/1010  1208 |
| *** | *** | *** | *** | *** | *** | *** | *** |
| 16 | INC 1209 | | | | | | 1101/1010/1010 |
| 17 | SUB | INC | | | | | 1101/1010/1010 |

APPARATUS AND METHOD FOR SPECULATIVELY UPDATING GLOBAL HISTORY AND RESTORING SAME ON BRANCH MISPREDICTION DETECTION

BACKGROUND OF THE INVENTION

1. Field of the Invention

This invention relates in general to the field of microprocessors, and more particularly to a method and apparatus for performing dynamic branch prediction by speculatively updating global branch history information.

2. Description of the Related Art

Computer instructions are typically stored in successive addressable locations within a memory. When processed by a Central Processing Unit (CPU), the instructions are fetched from consecutive memory locations and executed. Each time an instruction is fetched from memory, a program counter within the CPU is incremented so that it contains the address of the next instruction in the sequence. This is the next sequential instruction pointer, or NSIP. Fetching of an instruction, incrementing of the program counter, and execution of the instruction continues linearly through memory until a program control instruction is encountered.

A program control instruction, when executed, changes the address in the program counter and causes the flow of control to be altered. In other words, program control instructions specify conditions for altering the contents of the program counter. The change in the value of the program counter as a result of the execution of a program control instruction causes a break in the sequence of instruction execution. This is an important feature in digital computers, as it provides control over the flow of program execution and a capability for branching to different portions of a program. Examples of program control instructions include Jump, Test and Jump conditionally, Call, and Return.

A Jump instruction causes the CPU to unconditionally change the contents of the program counter to a specific value, i.e., to the target address for the instruction where the program is to continue execution. A Test and Jump conditionally causes the CPU to test the contents of a status register, or possibly compare two values, and either continue sequential execution or jump to a new address, called the target address, based on the outcome of the test or comparison. A Call instruction causes the CPU to unconditionally jump to a new target address, but also saves the value of the program counter to allow the CPU to return to the program location it is leaving. A Return instruction causes the CPU to retrieve the value of the program counter that was saved by the last Call instruction, and return program flow back to the retrieved instruction address.

In early microprocessors, execution of program control instructions did not impose significant processing delays because such microprocessors were designed to execute only one instruction at a time. If the instruction being executed was a program control instruction, by the end of execution the microprocessor would know whether it should branch, and if it was supposed to branch, it would know the target address of the branch. Thus, whether the next instruction was sequential, or the result of a branch, it would be fetched and executed.

Modern microprocessors are not so simple. Rather, it is common for modern microprocessors to operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif., 1996. The authors go on to provide the following excellent illustration of pipelining:

A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe— instructions enter at one end, progress through the stages, and exit at the other end, just as cars would in an assembly line.

Thus, as instructions are fetched, they are introduced into one end of the pipeline. They proceed through pipeline stages within a microprocessor until they complete execution. In such pipelined microprocessors it is often not known whether a branch instruction will alter program flow until it reaches a late stage in the pipeline. But, by this time, the microprocessor has already fetched other instructions and is executing them in earlier stages of the pipeline. If a branch causes a change in program flow, all of the instructions in the pipeline that followed the branch must be thrown out. In addition, the instruction specified by the target address of the branch instruction must be fetched. Throwing out the intermediate instructions, and fetching the instruction at the target address creates processing delays in such microprocessors.

To alleviate this delay problem, many pipelined microprocessors use branch prediction mechanisms in an early stage of the pipeline that predict the outcome of branch instructions, and then fetch subsequent instructions according to the branch prediction. Branch prediction schemes are commonly classified as either static or dynamic branch prediction schemes.

With a static branch predictor, the prediction remains the same for a given branch instruction throughout the entire execution of the program in which the branch instruction is contained. That is, if the static branch predictor predicts a given branch will be taken the first time the branch instruction is executed, the static branch predictor will predict the branch will be taken every time the branch instruction is executed throughout the execution of the program. Thus, the prediction made by a static branch predictor does not depend upon the dynamic behavior of the branch instruction.

In contrast, dynamic branch predictors keep a history of the outcome of branch instructions as a program executes and make predictions based upon the history. Dynamic branch predictors are effective because of the repetitive outcome patterns that branch instructions exhibit. Dynamic branch prediction implies that the prediction will change if the branch changes its behavior while the program is running. One time the branch instruction executes the dynamic branch predictor may predict the branch will be taken. But the next time the branch instruction executes, the dynamic branch predictor may predict the branch will not be taken, particularly if the branch was not taken the previous time.

Various dynamic branch prediction schemes have been proposed. See "A System Level Perspective on Branch Architecture Performance", by Brad Calder, Dirk Grunwald and Joel Emer, from Proceedings of MICRO-28, Nov. 29–Dec. 1, 1995 at Ann Arbor, Mich. Also see "Alternative Implementations of Two-Level Adaptive Branch Prediction", by Tse-Yu Yeh and Yale N. Patt, from *Proceedings of the 19th Annual Symposium on Computer Architecture,* ACM, New York, N.Y., 1992 incorporated by reference herein.

Perhaps the simplest dynamic branch prediction scheme is a simple array of one-bit storage elements, commonly referred to as a branch history table (BHT). The address of the branch instruction (or some portion thereof) whose outcome is being predicted is used to index into the BHT. The bit output by the BHT indicates the outcome of the last execution of the branch instruction (i.e., taken or not taken) and is used to predict the outcome of the current execution of the branch instruction. Each time the branch is executed, the BHT is updated with the outcome.

Improvements upon the simple scheme described have also been made. For example, a BHT may have more than one bit of history. Two-bit up-down saturating counters have been used as the contents of a BHT. Another improvement is commonly referred to as a Branch Target Buffer (BTB), used by the Pentium® processor for example. A BTB stores the last target address of the previously executed branch instruction that aliases into the same BTB location. Some BTB's store more than one target address if more than one branch instruction aliased to the same BTB location. Storing the target address eliminates the time required to calculate the target address of the branch instruction.

To the extent that the schemes described above use the branch instruction address to index into the BHT or BTB they are gathering a history of that particular branch instruction, as opposed to other branch instruction outcomes. This history is commonly referred to as a local branch history since it only records the history of a particular branch instruction after it is executed.

It has been observed that the behavior of a given branch instruction in a program is often correlated with the behavior of other branch instructions in the program. Therefore, when making a prediction about a given branch instruction, some branch predictors use not only the history of that particular branch instruction, but additionally use the behavior of other branch instructions to make a prediction about the current branch instruction. The history of the behavior of other branch instructions is commonly referred to as a global branch history, or global history.

A branch predictor that uses global branch history is commonly referred to as a correlating predictor, or two-level predictor. See *Computer Architecture: A Quantitative Approach,* p. 267. Various means of employing global branch history have also been described in the aforementioned references. For example, the PowerPC® 604 microprocessor employs a 2-bit up-down saturating counter BTB that is indexed by the exclusive OR of the lower n address bits of the branch instruction and a branch history pattern (BHP) The BHP is an n-bit shift register that stores the outcome of the last n branches.

However, in a pipelined microprocessor a situation may arise where a conditional branch instruction reaches an early stage in the pipeline where a prediction of its outcome needs to be made, but the outcome of a previous conditional branch instruction further down the pipeline has not yet been resolved. This situation may occur if the two branch instructions are relatively close together in the instruction stream. In this situation, the microprocessor designer is faced with a dilemma: stall the pipeline until the first branch is resolved, or make the second prediction with the old, incorrect global branch history.

If the designer chooses the former solution, the processor throughput is obviously diminished due to the wasted clock cycles while the second branch instruction waits for the resolution of the first. If the designer chooses the latter solution, the behavior of the first branch instruction will not be included in the history used to predict the behavior of the second branch instruction.

In the latter case, the accuracy of the second branch prediction will likely be worse than it would have been with the updated information of the resolution of the first branch. The accuracy may be adversely affected particularly if there is a dependency between the first and second branch instructions. In fact, if there is a dependency between the next series of branch instructions, the absence of the first branch prediction may adversely affect the prediction accuracy of the next several branches. As previously discussed, a decrease in branch prediction accuracy may adversely impact processor throughput.

These problems are exacerbated as microprocessor technology grows toward deeper pipelines. In the first instance, the probability that a first branch will not have been resolved before a second branch must be predicted increases as the number of stages between branch prediction and branch outcome resolution increases. In the second instance, the number of wasted clock cycles increases as the number of stages between branch prediction and branch outcome resolution increases.

Therefore, what is needed is an apparatus and method that predicts the outcome of a current branch instruction with the benefit of the prediction of the previous branch instruction if the actual outcome of the previous branch instruction has not yet been determined.

SUMMARY

To address the above-detailed deficiencies, it is an object of the present invention to provide a more accurate method and apparatus and microprocessor for predicting the outcomes of conditional branch instructions that are close in proximity.

Accordingly, in the attainment of the aforementioned object, it is a feature of the present invention to provide an apparatus for predicting the outcome of branch instructions in a microprocessor. The apparatus includes a storage element configured to store a global history of previous branch instruction outcomes of a plurality of branch instructions and branch control coupled to the storage element. The branch control includes a prediction output for making a prediction of an outcome of a branch instruction based on the global history stored in the storage element. Prior to resolution of the outcome of the branch instruction, the branch control updates the global history in the storage element in response to the prediction.

An advantage of the present invention is that a more accurate prediction is made because the outcome of an earlier, close branch instruction is included in the prediction of the later branch instruction. Another advantage of the present invention is that the more accurate prediction is made without stalling the pipeline to wait for the earlier branch instruction to be resolved.

In another aspect, it is a feature of the present invention to provide a microprocessor capable of performing branch prediction. The microprocessor includes instruction fetch logic that fetches a branch instruction and execution logic coupled to the instruction fetch logic. The execution logic resolves an outcome of the branch instruction. The microprocessor also includes a branch predictor coupled to the instruction fetch logic and the execution logic. The branch predictor includes a storage element that stores a global history of previous branch instruction outcomes of a plurality of branch instructions. The branch predictor also includes branch control coupled to the storage element. The branch control includes a prediction output for making a prediction of an outcome of the branch instruction based on the global history stored in the storage element. The instruction fetch logic fetches a next instruction in response to the prediction. Prior to resolution of the outcome of the branch instruction by the execution logic, the branch control updates the global history in the storage element in response to the prediction.

In yet another aspect, it is a feature of the present invention to provide a method for performing branch prediction in a microprocessor. The method includes predicting an outcome of a branch instruction based on a global history of previous branch instruction outcomes of a plurality of branch instructions stored in a storage element and updating the global history in the storage element in response to predicting the outcome of the branch instruction prior to resolution of the outcome of the branch instruction.

BRIEF DESCRIPTION OF THE DRAWINGS

These and other objects, features, and advantages of the present invention will become better understood with regard to the following description, and accompanying drawings where:

FIG. 4 (FIGS. 4A and 4B collectively) are block diagrams of two embodiments of the index function of FIG. 3.

DETAILED DESCRIPTION

Figure 1:
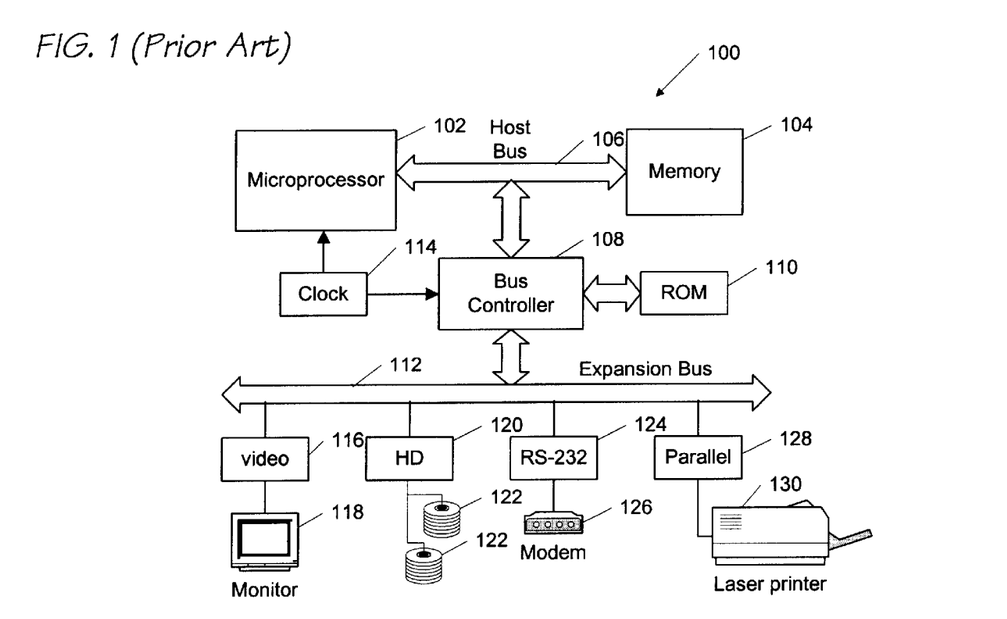
FIG. 1 is a prior art block diagram of a computer system that can incorporate a microprocessor according to the present invention.

Referring to FIG. 1, a block diagram of a typical computer system 100 is shown. The computer system 100 includes a microprocessor 102 connected to a memory 104 via a host bus 106. Also connected to the microprocessor 102 and the memory 104 via the host bus 106 is a bus controller 108. The bus controller 108 provides an interface between the host bus 106 and a ROM 110, and an expansion bus 112. A system clock 114 is provided to both the microprocessor 102 and the bus controller 108. Connected to the expansion bus 112 is a monitor 118 via a graphics controller 116, hard disk drives 122 via a disk interface 120, a modem 126 via an RS-232 interface 124, and a printer 130 via a parallel port 128.

In operation, the microprocessor 102 executes instructions, including branch instructions, retrieved from either the memory 104, the ROM 110 or the hard disks 122. The microprocessor can retrieve data from or store data to the memory 104 or the hard disks 122. In addition, the microprocessor 102 can send data to either the modem 126 or the printer 130. The monitor 118 provides a user interface to the microprocessor 102. The computer system 100 is typical of the type of computing system environment into which a processor according to the present invention may be used.

Figure 2:
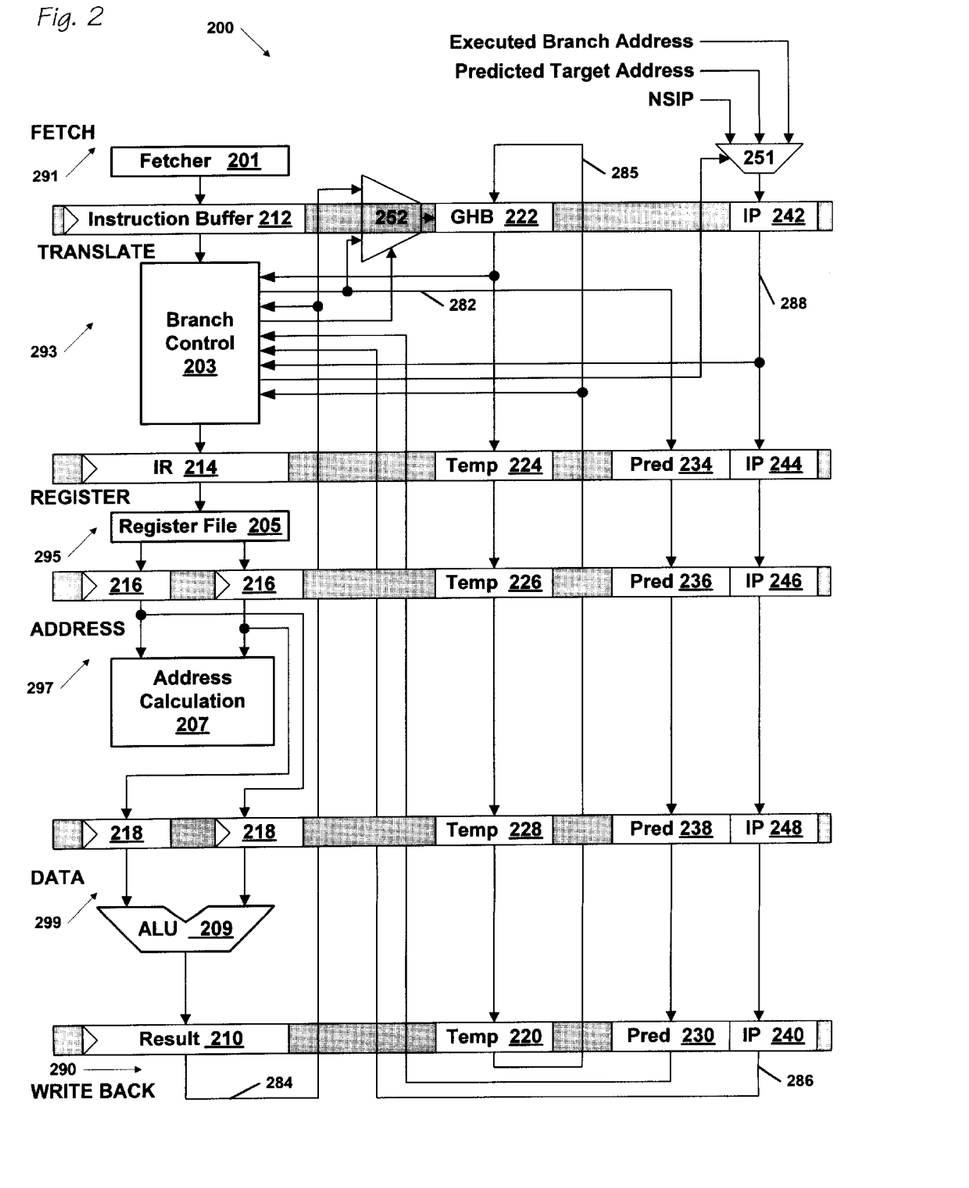
FIG. 2 is a block diagram of a pipeline microprocessor according to the present invention and in particular a dynamic branch predictor illustrated in FIG. 3.

Referring now to FIG. 2, a six-stage pipeline microprocessor 200 according to the present invention is shown. The microprocessor 200 comprises fetch 291, translate 293, register 295, address 297, data 299 and write back 290 stages coupled together to form a pipeline through which instructions are processed.

The fetch stage 291 includes a fetcher 201, which fetches instructions that are to be executed by the microprocessor 200. The fetcher 201 fetches instructions according to the contents of an instruction pointer (IP) 242 and places the instructions into an instruction buffer 212. Normally the IP 242 includes the value of a next sequential instruction pointer (NSIP), which is the address of the previous instruction plus the size of the previous instruction. However, when a branch instruction is taken, the executed target address is provided to the IP 242 to indicate the change in program flow effected by the branch instruction. Additionally, if it is predicted that a conditional branch instruction will be taken, the predicted target address of the branch instruction is provided to the IP 242. This enables the fetch stage 291 to fetch as the next instruction the instruction at the branch target address rather than the instruction in the next sequential memory location. A branch control 203 in the translate stage 293 selects, via a mux 251, the contents to be loaded into the IP 242.

The translate stage 293 translates or decodes the fetched macro instructions, such as conditional branch instructions, in the instruction buffer 212 into a sequence of micro operations that may be executed by the microprocessor 200. The micro operations are placed into an instruction register (IR) 214. The translate stage 293 includes branch control 203 which, among other things, makes predictions about the outcome of conditional branch instructions.

The branch control 203 receives the address of branch instructions from the IP 242 via signal 288 and makes a prediction of the outcome of the branch instruction based upon the branch instruction address. The branch instruction address is piped down with the branch instruction through the various stages of the pipeline via registers 244, 246, 248 and 240. The branch control 203 receives the branch instruction address, which was piped down along with the branch instruction, via signal 286 and uses the branch instruction address to update a branch history table within the branch control 203 (described in FIG. 3). The branch control 203 also makes predictions based upon a global history of branch instruction outcomes within a global history buffer (GHB) 222, discussed in more detail below.

The branch control 203 indicates its prediction of the outcome of a conditional branch on prediction signal 282.

The prediction is stored in a prediction (Pred) register 234. The prediction is piped down with the conditional branch instruction through the various stages of the pipeline via prediction registers 236, 238 and 230. The prediction is provided from the last prediction register 230 in the pipeline to branch control 203 so that branch control 203 may later compare the prediction with the branch outcome to determine if the prediction was correct.

The contents of the GHB 222 (prior to being updated with the prediction, as will be described below) is also piped down with the conditional branch instruction through the various stages of the pipeline via temporary (Temp) registers 224, 226, 228 and 220. The contents of the last temp register 220 in the pipeline is provided back to the GHB 222 via line 285 so that branch control 203 may restore the contents of the GHB 222 if the prediction was incorrect. If the prediction was incorrect, the branch control 203 will update the GHB 222 to reflect the actual branch outcome after restoring the GHB 222 as will be discussed in more detail below. The contents of temp register 220 are also provided via line 285 to the branch control 203.

The register stage 295 retrieves operands specified by the micro operations from a register file 205 for use by later stages in the pipeline. Preferably, the register file 205 includes a status flags register that is used in determining whether branch conditions have been satisfied.

The address stage 297 calculates memory addresses specified by micro operations, to be used in data storage and retrieval operations. In one embodiment, the branch target address of the branch instruction is calculated in the address stage 297 by address calculation unit 207. In another embodiment, the branch target address is calculated in the translate stage. For a description of branch target address calculation in the translate stage see U.S. patent application Ser. No. 08/962,344 entitled "Method and Apparatus for Branch Address Calculation During Decode" (IDT:1350) filed Oct. 31, 1997 by G. Glenn Henry and Terry Parks, which is hereby incorporated by reference.

The data/ALU stage 299 either performs ALU operations on data retrieved from the register file 205, or reads/writes data from/to memory using the memory address calculated in the address stage 297. The data/ALU stage 299 also resolves the outcomes of conditional branch instructions. That is, the data/ALU stage 299 determines whether or not the condition upon which the conditional branch instruction will branch has been met. An example of a branch condition is whether or not a particular flag in a status register is set or clear, such as a carry flag or an overflow flag. The data/ALU stage 299 provides the result, or outcome, of the determination of the condition to a result register 210.

The write back stage 290 writes the result of a data read operation, or an ALU operation, to the register file or to a memory location. The write back stage 290 also provides the result of the conditional branch outcome to the GHB 222 via mux 252 and to branch control 203 via signal 284. This enables branch control 203 to restore the GHB 222 with the contents of the GBH 222 prior to the prediction if the prediction was incorrect.

Figure 3:
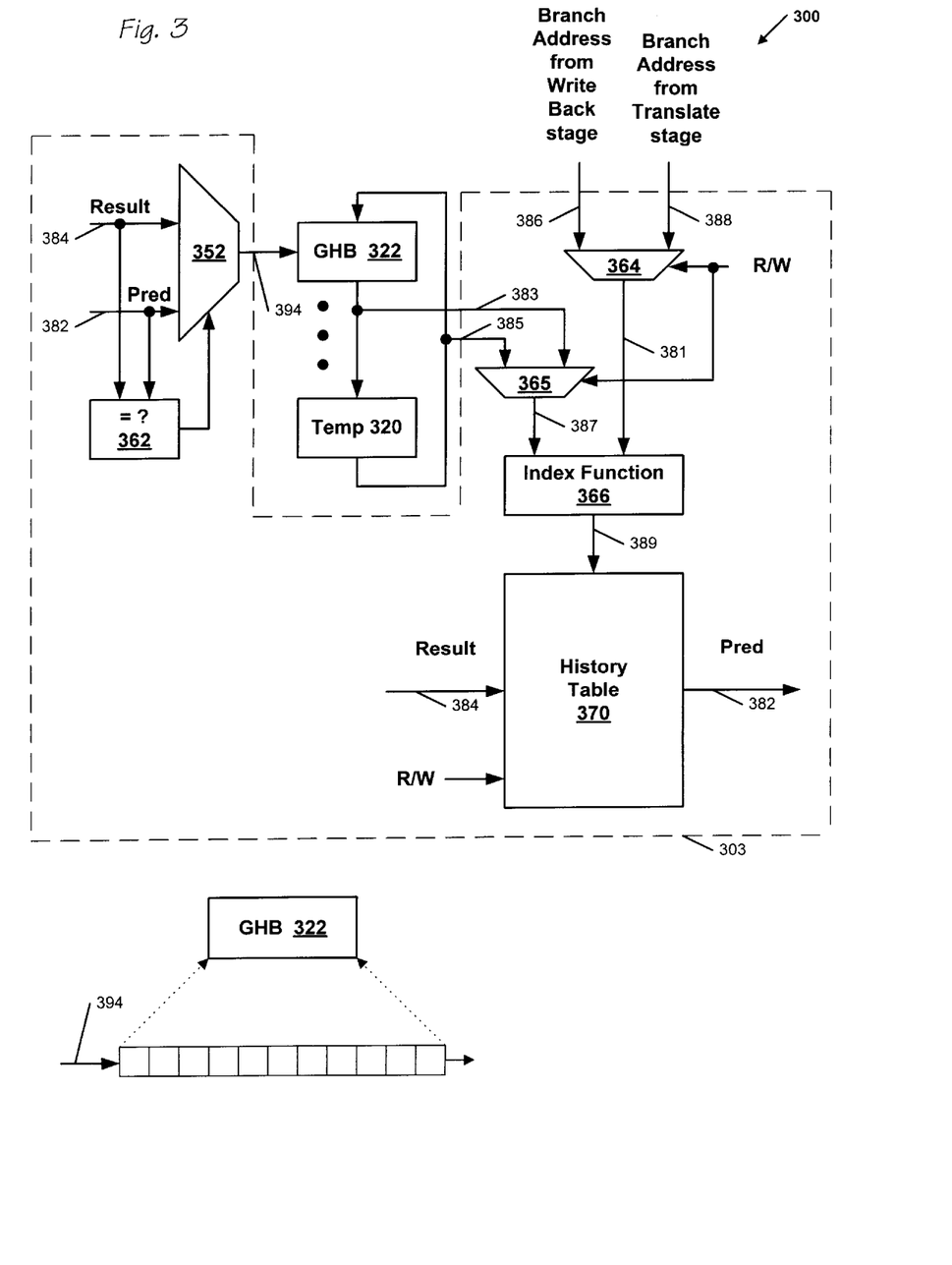
FIG. 3 is a block diagram of a dynamic branch predictor according to the present invention including an embodiment of the global history buffer.

Referring now to FIG. 3, a block diagram of a dynamic branch predictor 300 according to the present invention is shown. Like elements with FIG. 2 have been identified by like numbers, with the hundreds digit being replaced by a 3. The dynamic branch predictor 300 comprises branch control 303, GHB 322 and Temp register 320 coupled to branch control 303. Although not shown, the global history is piped down from the GHB 322 to Temp 320 through Temp registers 224–228.

The lower portion of FIG. 3 illustrates an embodiment of the GHB 322. The GHB 322 comprises an n-bit wide shift register, where each bit records whether the branch was taken or not taken. Thus, the GHB 322 contains the outcomes of the most recent n branch instructions executed by the microprocessor. In one embodiment, GHB 322 comprises an 11bit shift register for storing the last 11 conditional branch instruction outcomes. Thus, the GBH 322 contains a global history of branch instruction executions as opposed to a local history of branch instructions. That is, the GBH 322 contains outcomes for any conditional branch instructions executed, unlike a local history, which contains outcomes for only conditional branch instructions which alias to a particular local history table location, as will be discussed below with reference to FIGS. 5–7.

The shift register receives as input a signal 394 that is the output of mux 352. The value of the input signal 394 is right shifted into the shift register. The right most, and oldest, bit in the shift register is discarded when a new outcome is shifted into the GHB 322. Because the GHB 322 contains a pattern of the outcome of the last n conditional branch instructions, the GHB 322 of the embodiment of the lower portion of FIG. 3 is commonly referred to as a branch history pattern (BHP).

By way of example, the GHB 322 would contain the following binary value $10011100010_2$ if the following sequence of branch instructions and outcomes were executed by the microprocessor:

JZ (Taken)
JO (Not Taken)
JNO (Not Taken)
JS (Taken)
JP (Taken)
JZ (Taken)
JNO (Not Taken)
JO (Not Taken)
JZ (Not Taken)
JC (Taken)
JO (Not Taken).

In the above example, common Pentium® conditional jump instruction mnemonics are used as described in the Intel Pentium Processor Family Developer's Manual Volume 3: Architecture and Programming Manual, 1995.

Advantageously, during normal operation branch control 303 controls mux 352 to select the prediction signal 382 onto signal 394 rather than result signal 384. This speculative update of the GHB 322 advantageously enables the branch predictor 300 to predict the outcome of a subsequent conditional branch instruction without having to wait until a previous branch instruction that is still in the pipeline is resolved. For illustration purposes, if the prediction accuracy of the branch predictor 300 is 95%, then 95% of the time the correct value is shifted into the GHB 322. The present invention provides a method of recovering and updating the contents of the GHB 322 in the 5% of the cases where the prediction is wrong, as will be described below.

Viewed alternatively, the speculative update of the GHB 322 enables the branch predictor 300 to make a more accurate prediction of the outcome of the subsequent branch instruction by having the benefit of the outcome of the previous branch instruction. This is particularly valuable where a dependency exists between the two branch instructions. More precisely, the speculative update is valuable where a dependency exists between the prior branch instruction and any of the n conditional branch instructions subsequent to the prior branch instruction, wherein n is the width of the GHB 322.

GHB 322 is further configured to selectively receive the contents of Temp register 320 as controlled by branch control 203. Comparator 362 compares the result 384 and the prediction 382 to determine if the prediction 382 was correct. If the prediction was incorrect, the comparator 362 controls mux 352 to select result signal 384 onto signal 394 to update the GHB 322 with the correct outcome after the GHB 322 has been restored with the contents of Temp register 320.

The branch predictor 300 further comprises a history table 370. The history table 370 stores branch prediction information based on a history of previous branch instruction outcomes. Preferably, the history table 370 stores local history information. That is, a location in the history table 370 stores outcomes only for conditional branch instructions which alias to that location rather than for other branch instructions executed.

Preferably, the history table 370 comprises an array of storage elements. Three embodiments of the history table 370 are described below with respect to FIGS. 5–7. The history table 370 generates the prediction signal 382. Preferably, the history table 370 is updated with conditional branch instruction outcomes via result signal 384.

In another embodiment, the history table 370 is updated with an indication of an agreement or disagreement between the outcome and a static branch predictor as described in U.S. patent application Ser. No. 09/203,884 entitled "Method and Apparatus Performing Branch Prediction Combining Static and Dynamic Branch Predictors" (IDT:1393) filed concurrently herewith, by G. Glenn Henry and Terry Parks.

The history table 370 array is indexed by a signal 389 received from an index function unit 366. The index function unit 366 receives two inputs. The first input is the global branch history. Branch control 303 controls a mux 365 to select the global history from either the GHB 322 via signal 383 or from Temp register 320 via signal 385. The selection is made depending upon whether a prediction is being read from the history table 370 or whether the history table 370 is being updated with the branch outcome.

The second input received by the history table 370 is the conditional branch instruction address via signal 381 that is the output of mux 364. When the prediction is to be read from the history table 370, branch control 303 controls mux 364 to select the conditional branch instruction address from the translate stage via signal 388. When the history table 370 is to be updated with the outcome of the branch, branch control 203 controls mux 364 to select the conditional branch instruction address which has been piped down to the write back stage via signal 386.

Thus, the information in the history table 370 is individually addressable by branch instruction address and only stores a history of outcomes for the branch instruction indexed by the instruction address (or a portion thereof), not all the branch instructions in the program. Therefore, the information in the history table 370 is referred to as local history information.

Figure 4A:
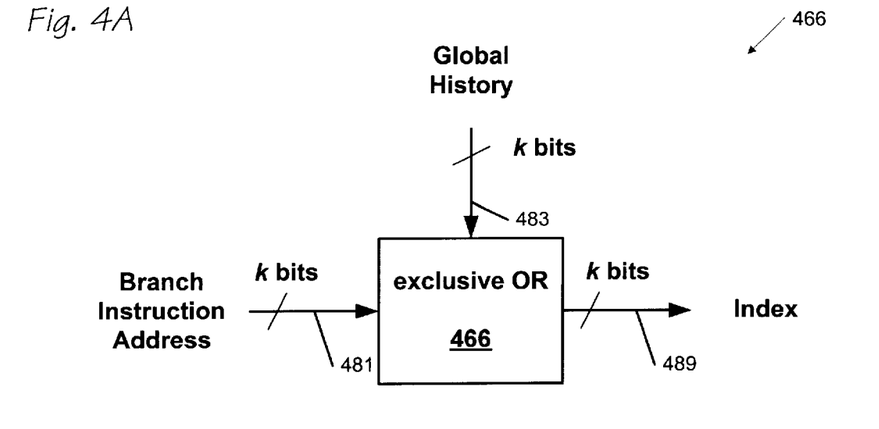
Figure 4B:
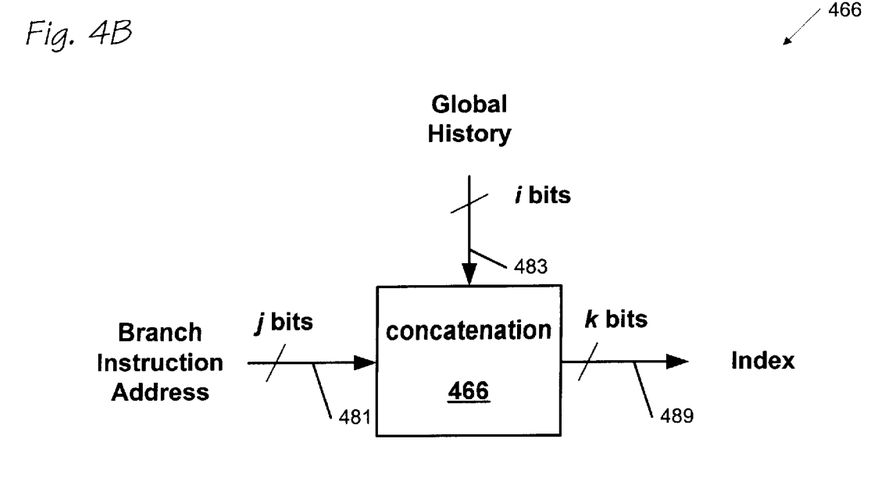

Referring now to FIG. 4 (FIGS. 4A and 4B collectively), two embodiments of the index function 466 are shown. Like elements with FIG. 3 have been identified by like numbers, with the hundreds digit being replaced by a 4.

As discussed previously, it has been observed that the behavior of a given branch instruction in a program is often correlated with the behavior of other branch instructions in the program. By examining both the local history of a given conditional branch instruction and the global history of the last n branch instructions executed, some of the dependencies between different branches are recognized and an improvement in the prediction accuracy is generally achieved. Examining both the local and global histories may be achieved by combining in some manner the branch instruction address and the global branch history to index into the branch history table. For a more detailed description of this concept see Scott McFarling, "Combining Branch Predictors", WRL technical Note TN-36, Digital quipment Corp., 1993, incorporated by reference herein.

FIG. 4A illustrates an exclusive OR index function 66. The global history 483 and the branch instruction address 481 are exclusive OR'ed together to produce the index 489. Preferably, the branch instruction address 481 comprises the lower order k bits of the branch instruction address, where the number of entries in the history table 370 is $2^k$.

FIG. 4B illustrates a concatenation index function 466. The global history 483 and the branch instruction address 481 are concatenated together to produce the index 489. Preferably, lower order j bits of the branch instruction address 481 are concatenated with the i bits of the global history 483 to produce a k-bit wide index 489. That is, k will be the sum of i and j, where the number of entries in the history table 370 is $2^k$.

It will be understood by one skilled in the art, that different index functions and different widths of the global history and lower order branch address may be chosen without departing from the spirit and scope of the present invention. Rather, it is the improvement of dynamic branch rediction accuracy obtained by the speculative updating of he global branch history that is of interest.

Figure 5:
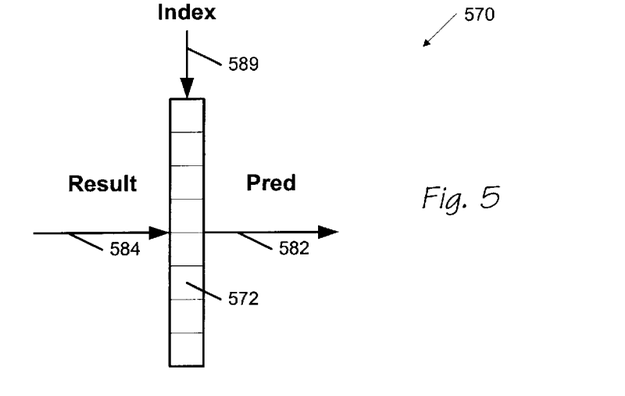
FIG. 5 is a block diagram of one embodiment of the history table of FIG. 3.

Referring now to FIG. 5 a first embodiment of the history table 370 of FIG. 3 is shown. Like elements with FIG. 3 have been identified by like numbers, with the hundreds digit being replaced by a 5. The history table 570 comprises an array of $2^k$ storage elements 572, where k is the number of index 589 bits received by the history table 570. Each storage element 572 comprises a single bit and the result 584 and prediction 582 comprise single bits.

In one embodiment, the bit indicates the outcome the last time the conditional branch instruction was executed. In another embodiment, the bit indicates an agreement or disagreement between the outcome and a static branch predictor as described in the above referenced U.S. patent application (IDT:1393).

Figure 6:
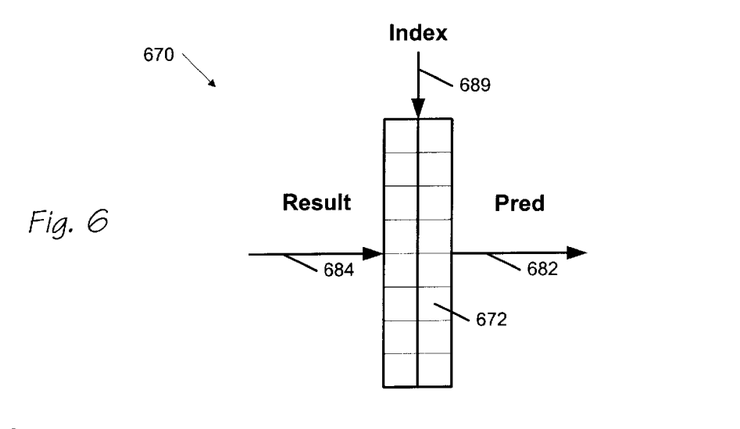
FIG. 6 is a block diagram of a second embodiment of the history table of FIG. 3.

Referring now to FIG. 6 a second embodiment of the history table 370 of FIG. 3 is shown. Like elements have been identified by like numbers, with the hundreds digit being replaced by a 6. History table 670 is similar to history table 570 of FIG. 5 except each array entry comprises a plurality of bits instead of a single bit. FIG. 6 shows each array comprising two bits. Thus, the rediction 682 is two bits wide.

In one embodiment, each array entry comprises a two-bit saturating up-down counter. Each time the result 684 indicates the branch was taken, the counter increments, saturating at $11_2$. Each time the result 684 indicates the branch was not taken, the counter decrements, saturating at $00_2$. Thus, the prediction 682 may be one of four values: 00=strongly not taken, 01=not taken, 10=taken, 11=strongly taken.

Figure 7:
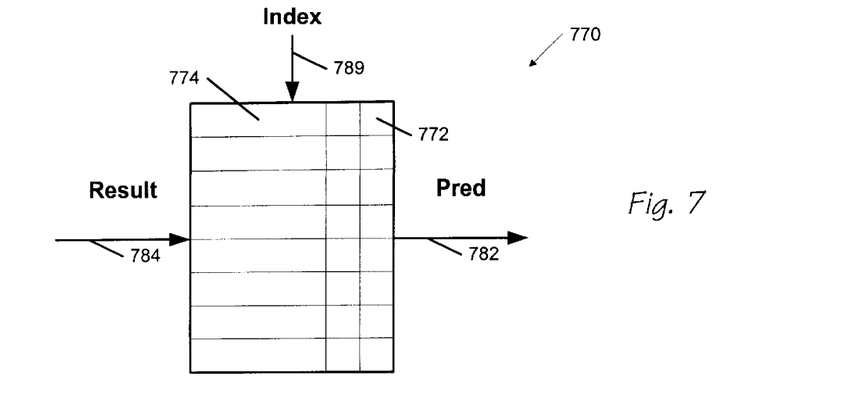
FIG. 7 is a block diagram of a third embodiment of the history table of FIG. 3.

Referring now to FIG. 7 a third embodiment of the history table 370 of FIG. 3 is shown. Like elements have been identified by like numbers, with the hundreds digit being replaced by a 7. History table 770 is similar to history table 670 of FIG. 6 except each array entry further comprises a branch target address 774. The branch target address 774 comprises the address to which the conditional branch instruction last branched.

Because less than all the branch instruction addresses are used to calculate the index 789, it is possible for different conditional branch instructions to alias into the same entry in the history table 770. In another embodiment, the array entry comprises a tag field 774 instead of or in addition to the target address. The tag field comprises the upper address bits of the conditional branch instruction that were not used to calculate the index 789. The tag field enables the branch predictor 300 to determine if the entry in the history table 770 is for the present conditional branch instruction or for a different conditional branch instruction.

Figure 8:
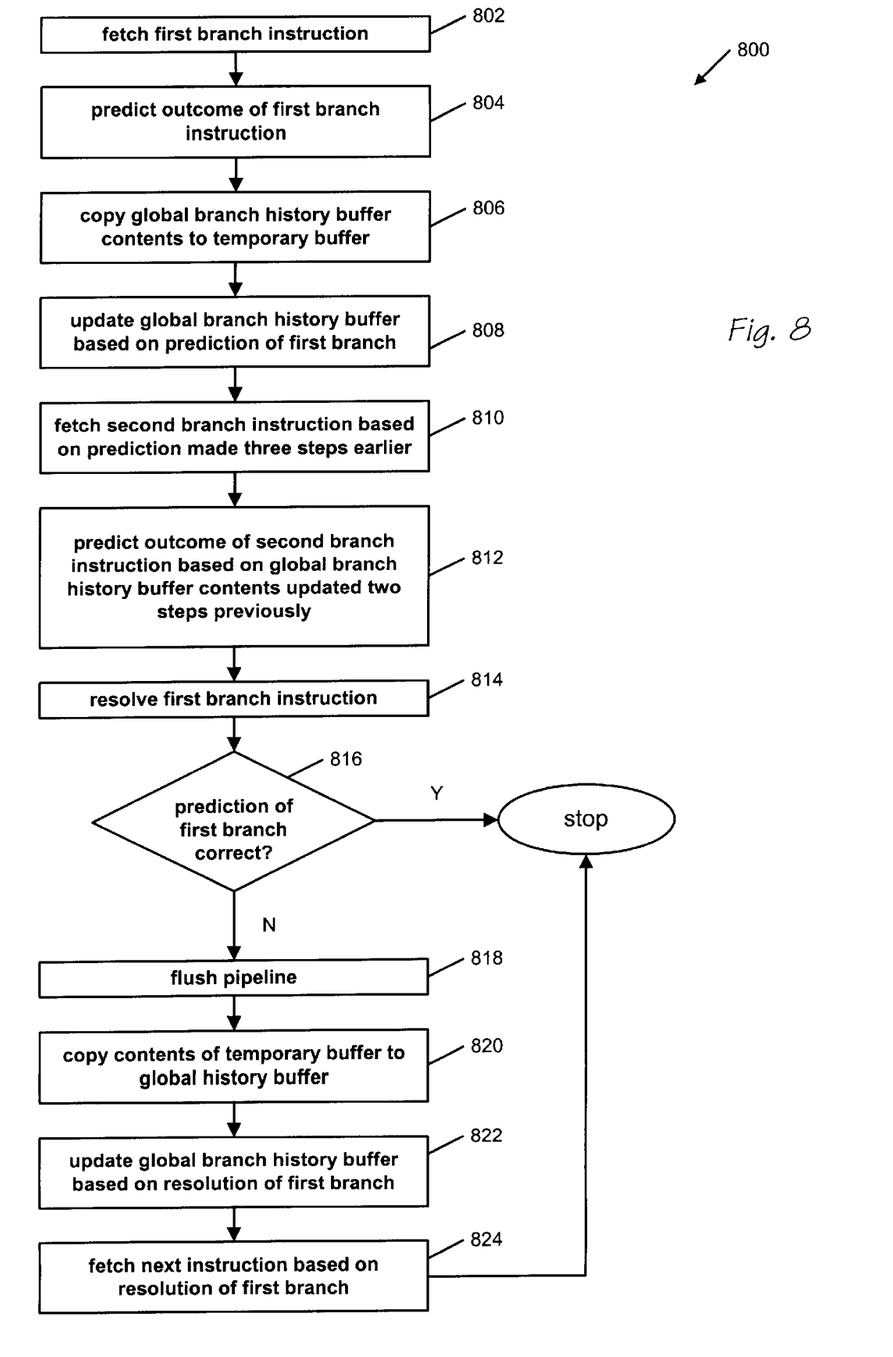
FIG. 8 is a flow chart illustrating steps executed by the microprocessor of FIG. 2 in the method of the present invention.

Referring now to FIG. 8, a flow chart 800 illustrating steps executed by the microprocessor 200 of FIG. 2 according to the method of the present invention is shown. In step 802, fetcher 201 fetches a first conditional branch instruction from an instruction cache (not shown) or from a memory (such as memory 104 of FIG. 1) and places the instruction into the instruction buffer 212. In step 804, branch control 203 receives the first branch instruction from the instruction register 212, the global history from the GHB 222 and the first branch instruction address 288 and predicts an outcome of the first branch instruction. In step 806 branch control 203 causes the contents of GHB 222, i.e., the global history, to be copied to Temp register 224. In step 808, branch control 203 causes the global history in the GHB 222 to be updated with the prediction of the first branch instruction made in step 804.

In step 810, fetcher 201 fetches a second conditional branch instruction. Fetcher 201 may have fetched other instructions in between the two conditional branch instructions. The fetches of the instructions following the fetch of the first branch instruction are made based upon the prediction made in step 804. That is, if the branch is predicted not taken, then fetcher 201 will fetch the next instruction at the next sequential instruction pointer (NSIP); however, if the branch is predicted taken, then fetcher 201 will fetch the next instruction from the target address of the first branch instruction.

In step 812, branch control 203 predicts an outcome of the second branch instruction based on the updated global history updated in the GHB 222 in step 808. The first branch instruction proceeds down the pipe, and in step 814 is resolved, i.e., the outcome of the first branch instruction is determined, in the data stage 299.

In step 816, branch control 203 determines whether the prediction of the first branch instruction made in step 804 was correct. If the prediction was incorrect, the microprocessor 200 flushes the pipeline, in step 818.

In step 820, branch control 203 causes the contents of Temp register 220 to be copied to the GHB 222 to restore the global history prior to the speculative update performed in step 808. In step 822, branch control 203 updates the global history in the GHB 222 with the actual outcome 284 of the first branch instruction. At this point, the GHB 222 contains the correct global branch history and may be used to predict the outcome of the next conditional branch instruction. In step 824, the microprocessor 200 fetches the next instruction from either the NSIP or the branch target address based upon the outcome of the first branch instruction.

Figure 9:
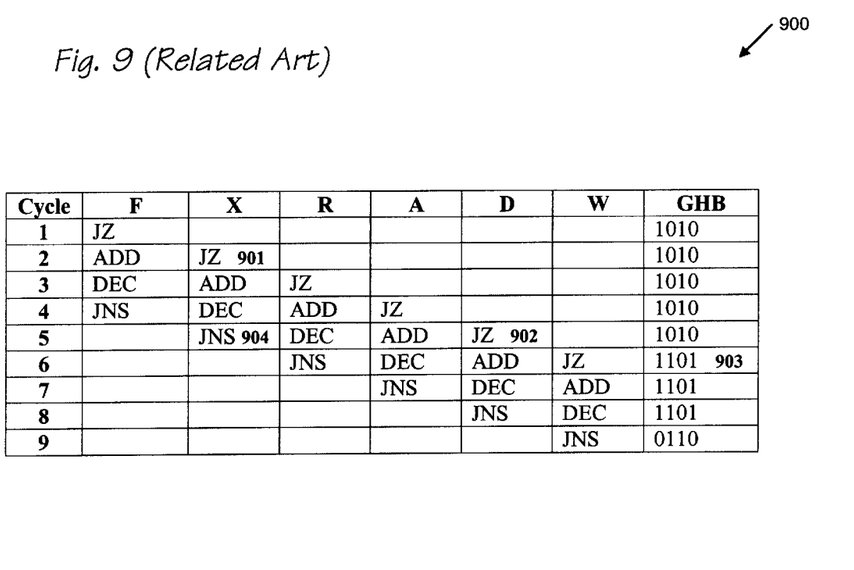
FIG. 9 is a block diagram illustrating processing stages within a related art pipeline microprocessor.

Referring now to FIG. 9, a block diagram 900 illustrating processing stages within a related art pipeline microprocessor is shown. FIG. 9 illustrates the sequence of events that might occur if the speculative update of the global branch history according to the present invention were not performed. That is, FIG. 9 illustrates making a prediction of the second branch instruction with old, incorrect global branch history. Clock cycles of microprocessor 200 are shown including each of the stages denoted as F, X, R, A, D and W corresponding to stages 291, 293, 295, 297, 299 and 290, respectively, of FIG. 2. The contents of the GHB 222 are shown as a four-bit value, with an initial value of 10102. For clarity, each macro-instruction is assumed to be translated into a single micro-operation.

During cycle 1, a jump if zero (JZ) conditional branch instruction is fetched. In cycle 2, the JZ instruction is translated and a prediction of the outcome is made in block 901. In this example, the JZ is predicted taken. Therefore, instructions from the target address of the JZ are fetched rather than from the NSIP. In this case an ADD instruction is fetched from the JZ target address during cycle 2. The JZ instruction proceeds down the pipeline stages and other instructions are fetched during clock cycles 3 and 4, including a second conditional branch instruction, JNS (jump if not sign).

During clock cycle 5, the outcome of the JZ instruction is determined in the data stage 299 in block 902. During cycle 6, the GHB 222 is updated with the outcome of the JZ as shown in block 903 (i.e., a 1 is right-shifted in the GHB 222). However, as shown in block 904, a prediction of the outcome of the JNS instruction is made during cycle 5, before the GHB 222 is updated in cycle 6. That is, the prediction of the JNS instruction is made with the old, incorrect global history value, i.e., the global history value that does not include the outcome of the JZ instruction. Therefore, some dependencies between the JZ instruction and the JNS instruction may not be taken into account in the prediction of the JNS instruction made during clock cycle 5. Consequently, the accuracy of the prediction of the JNS instruction outcome made during clock cycle 5 is likely reduced. During clock 9 the GHB 222 is updated with the outcome of the JNS, which was not taken in this example, as shown.

Figure 10:
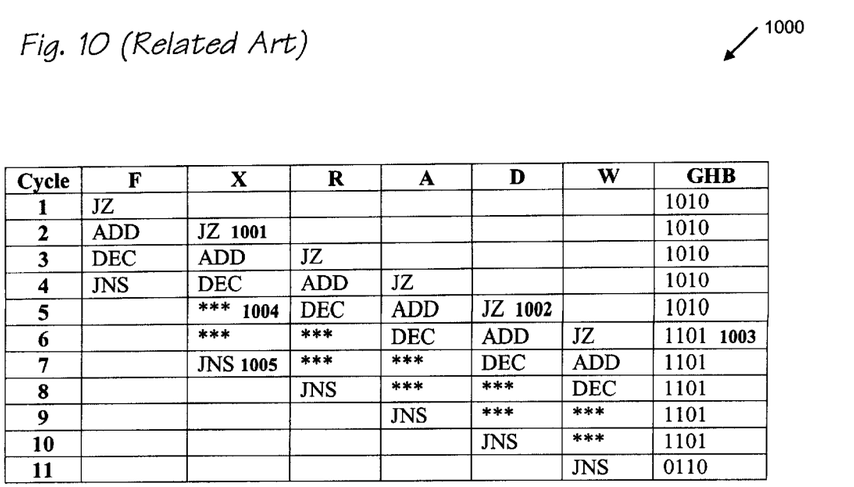
FIG. 10 is a block diagram illustrating processing stages within a related art pipeline microprocessor.

Referring now to FIG. 10, a block diagram illustrating processing stages within a related art pipeline microprocessor is shown. FIG. 10 illustrates the sequence of events that might occur if the speculative update of the global branch history according to the present invention were not performed and instead the pipeline were stalled to wait for the outcome of the JZ instruction. Clock cycles 14 are similar to those of FIG. 9.

During clock cycle 5, the translate stage 293 detects that a conditional branch instruction (JNS) requires translation and that an unresolved conditional branch instruction (JZ) still resides in the pipeline. The microprocessor 200 stalls, as shown in block 1004, waiting until clock cycle 7 for resolution of the first conditional branch instruction as shown in block 1005. As shown, two additional cycles must be wasted while waiting for the first conditional branch instruction to be resolved.

Figure 11:
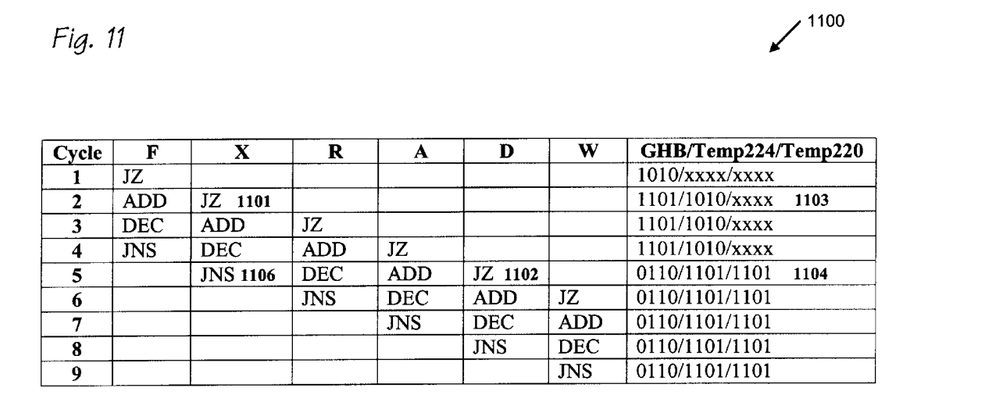
FIG. 11 is a block diagram illustrating processing stages within the microprocessor of FIG. 2 according to the steps of the present invention shown in FIG. 8.

Referring now to FIG. 11, a block diagram illustrating processing stages within the microprocessor of FIG. 2 according to the present invention is shown. FIG. 11 additionally shows the contents of Temp register 224 and Temp register 220. Initially the contents of Temp 224 and Temp 220 are don't care. FIG. 11 adds clarification by example to the description of the steps performed in the flowchart of FIG. 8.

During clock cycle 1, a first conditional branch instruction (JZ) is fetched as in step 802. During cycle 2 the JZ instruction is translated as shown in block 1101. Branch control 203 predicts the JZ will be taken, as in step 804, and updates the GHB 222 accordingly as shown in block 1103, as in step 808. Also shown in block 1103, the prior contents of the GHB 222 is copied to Temp 224 prior to the update of the GHB 222, as in step 806. During clock cycle 4 a second conditional branch instruction (JNS) is fetched, as in step 810.

During clock cycle 5, the branch control 203 advantageously makes a prediction of the outcome of the JNS instruction with the benefit of a global history in the GHB 222 that includes the prediction about the outcome of the JS as in step 812 of FIG. 8, as shown in block 1106, according to the present invention. Also during clock cycle 5, the branch instruction is resolved as shown in block 1102, as in step 814. Also during clock cycle 5, as shown, the GHB 222 is speculatively updated with the prediction of the JNS outcome, which is not taken in this example. Also during clock cycle 5, the version of the global history prior to clock cycle 2 which has proceeded down the pipeline with the JZ is copied into the Temp register 220.

During clock cycle 6, the outcome, or result, of the JZ is provided to the branch control 203, thereby enabling the branch control 203 to determine if the prediction was correct, as in step 816. Since the JZ was correctly predicted in the example of FIG. 11, no steps are necessary to recover from a misprediction and the instructions fetched based upon the prediction, namely the ADD, DEC and JNS instructions execute to completion during clock cycles 7–9.

Figure 12:
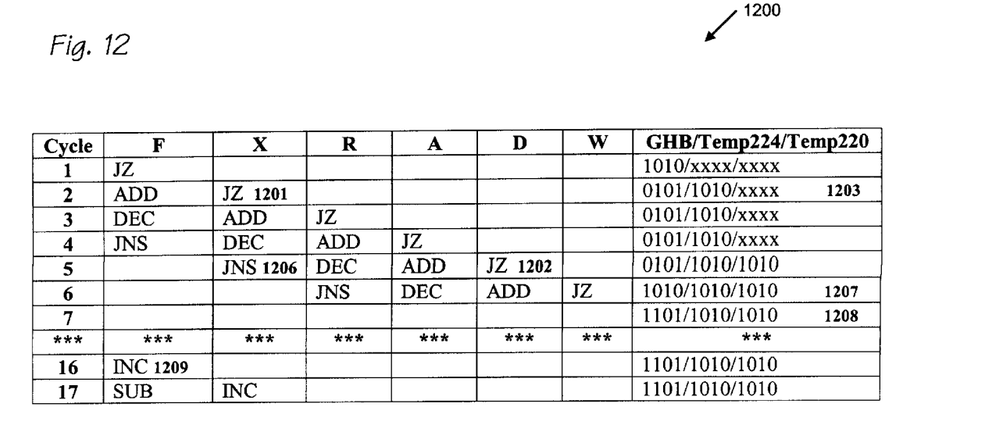
FIG. 12 is a block diagram illustrating processing stages within the microprocessor of FIG. 2 according to the steps of the present invention shown in FIG. 8.

Referring now to FIG. 12, a block diagram illustrating processing stages within the microprocessor of FIG. 2 according to the present invention is shown. FIG. 12 is similar to FIG. 11 except that in the example of FIG. 12, the first branch instruction is mispredicted to illustrate the steps executed to restore the global branch history according to the present invention. That is, during cycle 2, a not taken is predicted rather than a taken, and the GHB 222 is updated accordingly as shown in block 1203.

Next, branch control 203 determines the prediction was incorrect, as in step 816. Therefore, the pipeline is flushed, as in step 818, and branch control 203 causes the contents of the Temp register 220 to be copied to the GHB 222, as in step 820, as shown in block 1207. Next the restored global branch history in the GBH 222 is updated based on the actual outcome of the JZ, as in step 822, as shown in block 1208. After the pipeline has been flushed, the fetcher 201 fetches the correct next instruction based on the actual outcome of the JZ, as in step 824, as shown in block 1209. In this example, an INC (increment) instruction is fetched from the branch target address since the branch was in fact taken.

Although the present invention and its objects, features, and advantages have been described in detail, other embodiments are encompassed by the invention. For example, variations of the method of employing the global branch history to index into the branch history table may exist. Additionally, variations of the information stored within the branch history table may exist without departing from the spirit and scope of the present invention. As long as the global branch history is employed to make a prediction of branch instruction outcome, the global branch history can be speculatively updated prior to making a prediction for the next branch instruction to improve the accuracy of the prediction. Variations on pipeline architecture exist, which combine some stages described in the present invention into a single stage, or separate one of the described stages into two or more stages. In addition, some microprocessors reorder the stages described as needed. The number or order of pipeline stages is not significant to the operation of the present invention. Rather, it is the improvement of dynamic branch prediction accuracy obtained by the speculative updating of the global branch history that is of interest.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus for predicting the outcome of branch instructions in a microprocessor, comprising:

a first storage element configured to store a global history of previous branch instruction outcomes;

branch control, coupled to said first storage element, configured to provide a prediction output for making a prediction of an outcome of a branch instruction based on said global history stored in said first storage element;

wherein said branch control is configured to update said global history in said first storage element in response to said prediction output prior to resolution of said branch instruction;

wherein said branch control is further configured to make a prediction of an outcome of a second branch instruction based on said global history stored in said first storage element after said global history in said first storage element has been updated in response to said prediction of said outcome of said first branch instruction and prior to resolution of said outcome of said first branch instruction;

a second storage element coupled to said branch control and to said first storage element;

wherein said branch control is further configured to copy said global history in said first storage element to said second storage element prior to updating said global history in said first storage element in response to said prediction of said outcome of said first branch instruction;

a result input indicating said outcome of said first branch instruction; and a comparator configured to compare said outcome of said first branch instruction and said prediction of said outcome of said first branch instruction to determine if said prediction of said outcome of said first branch instruction is correct and if said prediction of said outcome of said first branch instruction is incorrect to copy said global history in said second storage element to said first storage element and to update said global history in said first storage element in response to said outcome of said first branch instruction.

2. The apparatus of claim 1, further comprising:

a history table configured to store a local history of previous outcomes of said branch instruction coupled to said branch control, wherein said branch control is configured to make said prediction based on a combination of said global and local histories.

3. The apparatus of claim 2, wherein said history table comprises an array of storage elements configured to store said local history, wherein said array is indexed at least in part by a portion of an address of said branch instruction.

4. The apparatus of claim 3, wherein said array is indexed as a function of said global history and said portion of said address.

5. The apparatus of claim 4, wherein said history table is indexed by performing an exclusive or of said global history and said portion of said address.

6. The apparatus of claim 4, wherein said array is indexed by concatenating said global history and said portion of said address.

7. The apparatus of claim 2, wherein said local history comprises previous branch instruction target addresses.

8. A method for performing branch prediction in a microprocessor, comprising:

predicting an outcome of a branch instruction based on a global history of previous branch instruction outcomes of a plurality of branch instructions stored in a first storage element;

updating said global history in said first storage element in response to said predicting said outcome of said branch instruction prior to resolution of said outcome of said branch instruction;

predicting an outcome of a second branch instruction based on said global history stored in said first storage element after said updating said global history in said first storage element in response to said predicting said outcome of said first branch instruction and prior to resolution of said outcome of said first branch instruction;

copying said global history in said first storage element to a second storage element prior to said updating said global history in said first storage element in response to said predicting said outcome of said first branch instruction;

determining said outcome of said first branch instruction; and comparing said outcome of said first branch instruction and said prediction of said outcome of said first branch instruction to determine if said prediction of said outcome of said first branch instruction is correct; and copying said global history in said second storage element to said first storage element and updating said global history in said first storage element in response to said outcome of said first branch instruction if said prediction of said outcome of said first branch instruction is incorrect.

9. The method of claim 8, further comprising:

flushing a pipeline of said microprocessor and fetching a next instruction in response to said outcome of said first branch instruction if said prediction of said outcome of said first branch instruction is incorrect.

10. The method of claim 8, further comprising:

storing a local history of previous outcomes of said branch instruction in a history table; and making said predictions of said outcomes of said branch instruction based on a combination of said global and local histories.

11. The method of claim 10, wherein said history table comprises an array of storage elements configured to store said local history, wherein said method further comprises indexing into said array at least in part by a portion of an address of said branch instruction.

12. The method of claim 11, further comprising indexing into said array as a function of said global history and said portion of said address.

13. The method of claim 12, wherein said function comprises an exclusive or of said global history and said portion of said address.

14. The method of claim 12, wherein said function comprises a concatenation of said global history and said portion of said address.

15. The method of claim 8, wherein said updating said global history in said storage element in response to said predicting said outcome of said branch instruction is performed during translation of said branch instruction.

16. A microprocessor capable of performing branch prediction, comprising:

instruction fetch logic configured to fetch a branch instruction;

execution logic coupled to said instruction fetch logic configured to resolve an outcome of said branch instruction; and a branch predictor coupled to said instruction fetch logic and said execution logic, comprising:

a first storage element configured to store a global history of previous branch instruction outcomes of a plurality of branch instructions;

branch control coupled to said first storage element comprising a prediction output for making a prediction of an outcome of said branch instruction based on said global history stored in said first storage element, wherein said instruction fetch logic is configured to fetch a next instruction in response to said prediction;

wherein said branch control is configured to update said global history in said first storage element in response to said prediction prior to resolution of said outcome of said branch instruction by said execution logic;

wherein said branch control is further configured to make a prediction of an outcome of a second branch instruction fetched by said instruction fetch logic based on said global history stored in said first storage element after said global history in said first storage element has been updated in response to said prediction of said outcome of said first branch instruction and prior to resolution of said outcome of said first branch instruction by said execution logic;

a second storage element coupled to said branch control and to said first storage element;

wherein said branch control is further configured to copy said global history in said first storage element to said second storage element prior to updating said global history in said first storage element in response to said prediction of said outcome of said first branch instruction;

a result input configured to receive from said execution logic an indication of said outcome of said first branch instruction; and a comparator configured to compare said outcome of said first branch instruction and said prediction of said outcome of said first branch instruction to determine if said prediction of said outcome of said first branch instruction is correct and if said prediction of said outcome of said first branch instruction is incorrect to copy said global history in said second storage element to said first storage element and to update said global history in said first storage element in response to said outcome of said first branch instruction.

17. The microprocessor of claim 16, wherein said microprocessor is configured to flush said pipeline and to fetch a next instruction in response to said outcome of said first branch instruction if said prediction of said outcome of said first branch instruction is incorrect.

18. The microprocessor of claim 16, wherein said branch predictor further comprises:

a history table configured to store a local history of previous outcomes of said branch instruction coupled to said branch control, wherein said branch control is configured to make said predictions based on a combination of said global and local histories.

19. The microprocessor of claim 18, wherein said history table comprises an array of storage elements configured to store said local history, wherein said array is indexed at least in part by a portion of an address of said branch instruction.

20. The microprocessor of claim 18, wherein said array is indexed as a function of said global history and said portion of said address.

21. The microprocessor of claim 20, wherein said history table is indexed by performing an exclusive or of said global history and said portion of said address.

22. The microprocessor of claim 20, wherein said array is indexed by concatenating said global history and said portion of said address.

* * * * *